(12) United States Patent
Bommana et al.

(10) Patent No.: US 11,513,978 B2
(45) Date of Patent: Nov. 29, 2022

(54) DUAL DATA PORTS WITH SHARED DETECTION LINE

(71) Applicant: Western Digital Technologies, Inc., San Jose, CA (US)

(72) Inventors: Sesibhushana Rao Bommana, Bangalore (IN); Mukesh Kumar Panda, Bangalore (IN); Sirajudeen Peermohamed, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/185,859

(22) Filed: Feb. 25, 2021

(65) Prior Publication Data

US 2022/0058142 A1  Feb. 24, 2022

Related U.S. Application Data

(60) Provisional application No. 63/067,277, filed on Aug. 18, 2020.

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0042* (2013.01)

(58) Field of Classification Search
CPC .......... G06F 13/1668; G06F 13/4282; G06F 2213/0042
See application file for complete search history.

(56) References Cited

U.S. PATENT DOCUMENTS

| 8,734,186 | B2* | 5/2014 | Panko | H01R 13/6666 439/620.26 |
| 2003/0236934 | A1* | 12/2003 | Park | G06F 3/0679 710/74 |
| 2007/0028127 | A1* | 2/2007 | Kim | G06F 11/1443 710/305 |
| 2008/0222341 | A1* | 9/2008 | Lin | G06F 13/426 710/316 |
| 2018/0336151 | A1* | 11/2018 | Moore | G06F 13/4022 |
| 2020/0201803 | A1* | 6/2020 | Maeda | G06F 13/4027 |

* cited by examiner

*Primary Examiner* — Henry Tsai
*Assistant Examiner* — Harry Z Wang
(74) *Attorney, Agent, or Firm* — Chang & Hale LLP

(57) ABSTRACT

Devices and methods are disclosed for detecting which of a multiple ports of a storage device is connected to a host system using a shared detection line. In certain embodiments, a storage device includes non-volatile memory, a first data port, a second data port having a faster data transfer speed, a shared detection line, and control circuitry. The control circuitry can be configured to detect voltage on the shared detection line in response to a connection of at least one of the first data port and the second data port to the host system, determine which of the first data port or the second data port is connected to the host system, and establish a data connection with the host system at the first data transfer speed or the second data transfer speed based on the port connected to the host system.

20 Claims, 5 Drawing Sheets

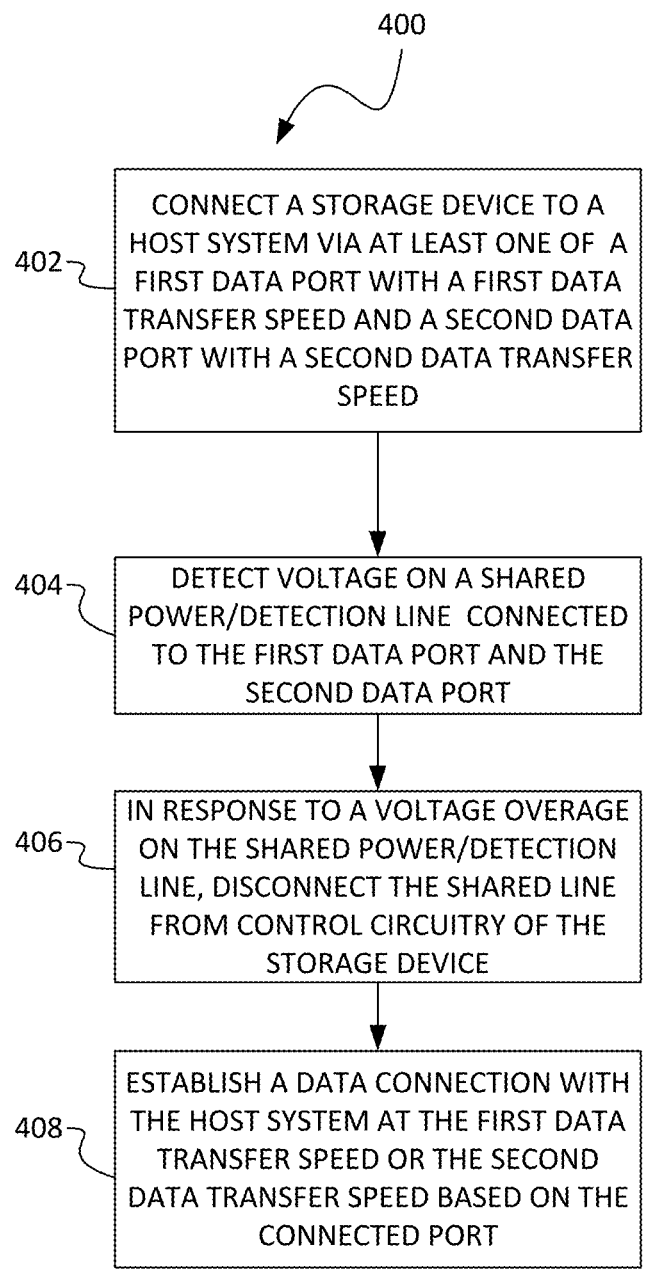

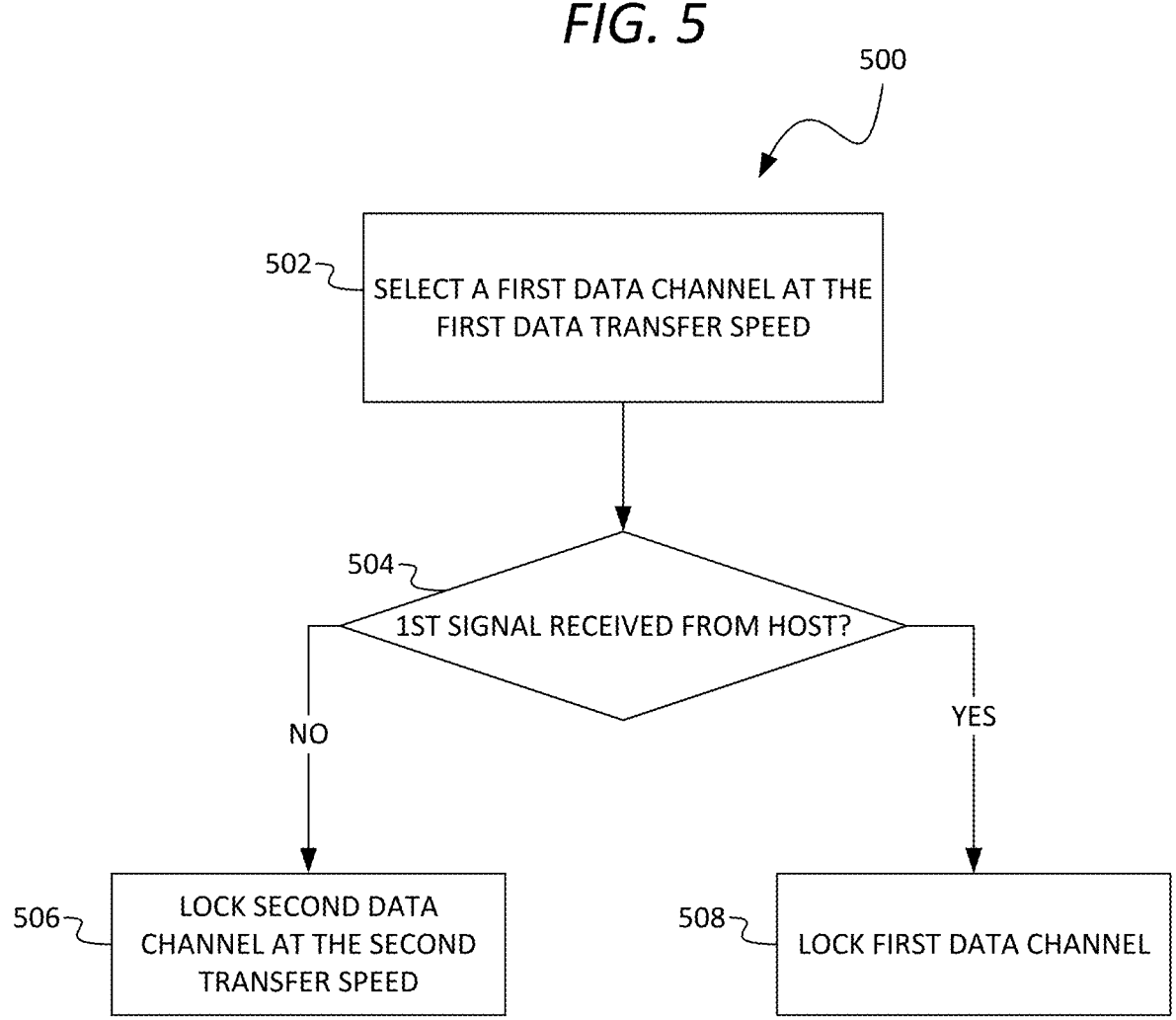

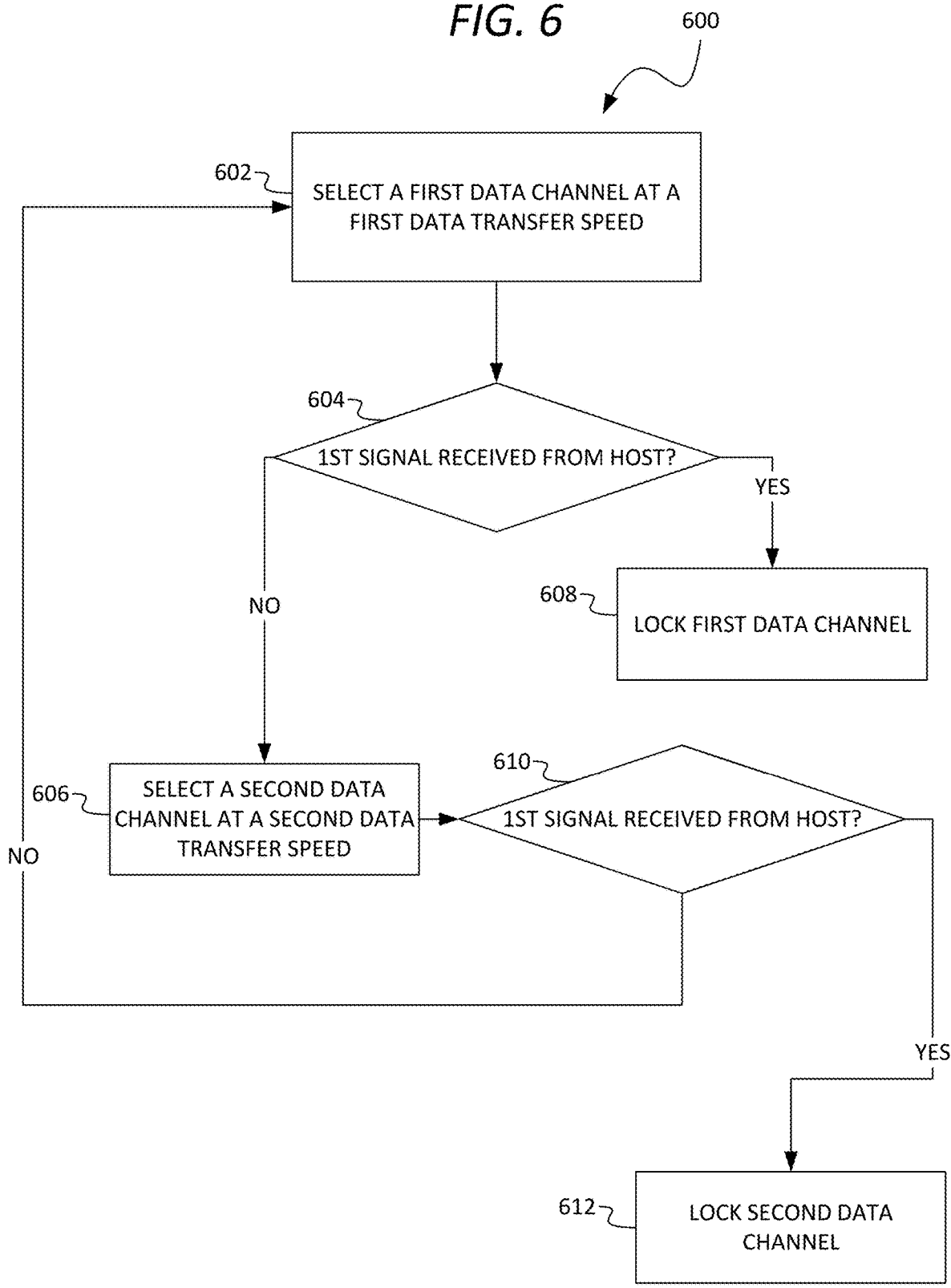

DUAL DATA PORTS WITH SHARED DETECTION LINE

BACKGROUND

Field

This disclosure relates to data storage devices. More particularly, the disclosure relates to devices and methods for detecting a connection to a host system by data storage devices.

Description of Related Art

Data storage devices provide access to data stored on the devices to a host system. Universal Serial Bus (USB) devices run an enumeration process when they are connected to the host system. USB enumeration is a process for detecting, identifying and loading drivers for a USB device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 4 illustrates a process for connecting the storage device to the host system.

FIG. 5 illustrates a process for identifying which port of a storage device is connected to a host system, in accordance with some embodiments.

FIG. 6 illustrates an alternative process for identifying which port of the storage device is connected to the host system, in accordance with some embodiments.

DETAILED DESCRIPTION

Figure 1:
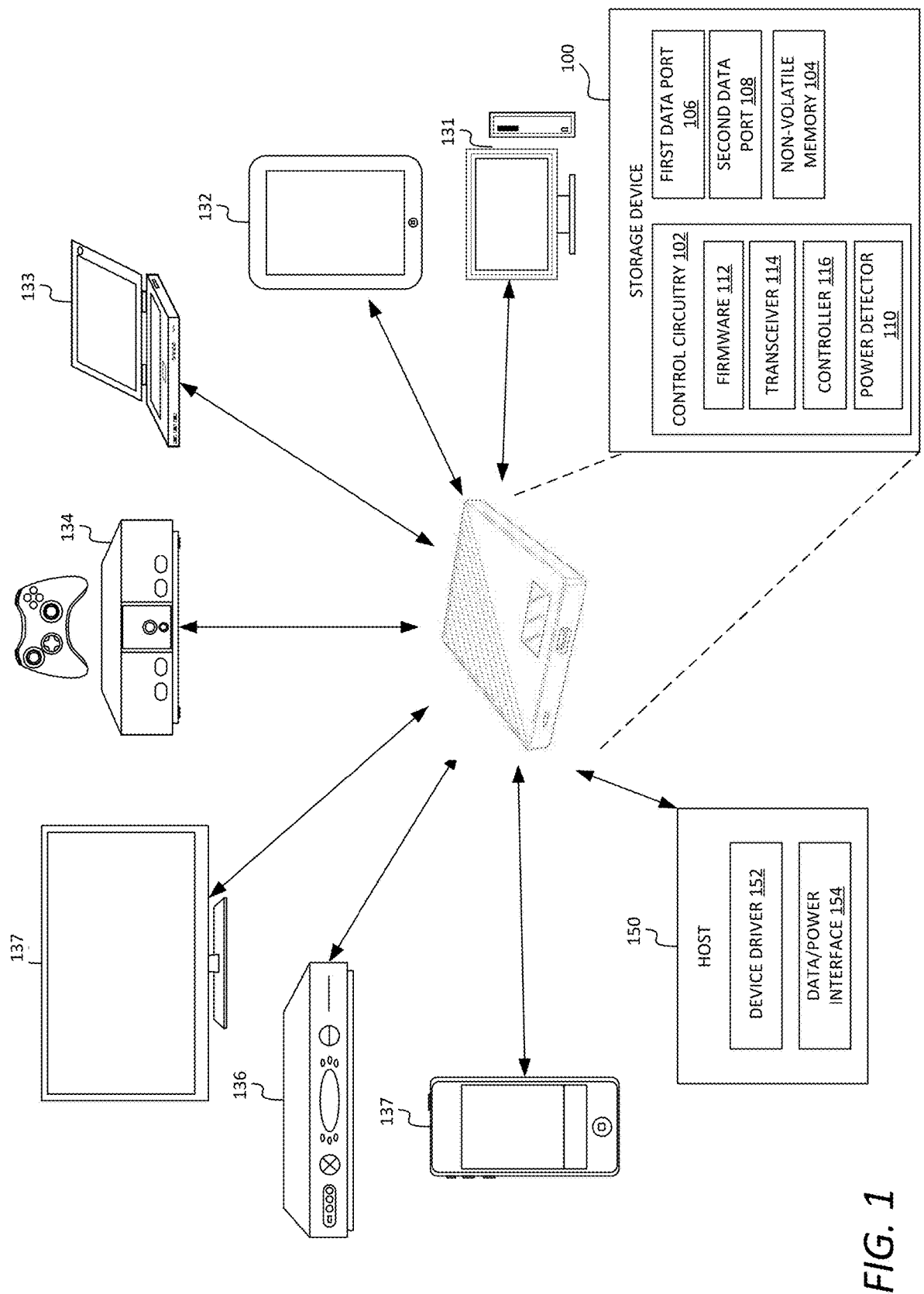
FIG. 1 is a diagram illustrating an embodiment of a storage device with multiple ports, in which the storage device is communicatively coupled to a host system, in accordance with some embodiments.

While certain embodiments are described, these embodiments are presented by way of example only, and are not intended to limit the scope of protection. Indeed, the novel methods and devices described herein may be embodied in a variety of other forms. Furthermore, various omissions, substitutions, and changes in the form of the methods and devices described herein may be made without departing from the scope of protection.

Overview

Disclosed herein are devices and methods for identifying a connected port with a storage device having multiple ports while using a shared voltage or detection line. Some storage devices do not have their own internal power source (e.g., power supply unit or battery), but instead receive power from a connected host system and run only on that external power. For example, USB thumb drives or direct attached storage (DAS) devices, such as Western Digital's Passport® portable external drives, typically rely on the host system to provide power through a combined data/power port (e.g., USB Type-A, Type-C, etc.) as they lack their own internal power source.

When the host system is connected to a data port, the storage device recognizes that the host system is connected by detecting voltage on a detection line connected to the data port of the storage device. In single ported devices, it is easy to recognize the connected port. However, in devices with two or more ports, recognizing which port is connected to the host system is harder. Furthermore, correctly recognizing the correct port can affect the performance of the storage device, as devices may use different types of port with different performance. Identifying that the host system is connected to a port that supports a higher data throughput allows the storage device to transfer data at a higher speed.

Typically, storage devices use separate detection mechanisms connected to each port to identify which port is the connected port. For example, if a first port is connected, power is received on a first power detector connected to the first port. If power is received on a second port, a second power detector connected to the second port is activated. The storage device can then distinguish which port is connected via the activated power detector. However, this approach requires additional hardware.

Thus, there is a benefit in being able to identify which port of multiple ports is connected using a shared detection line and shared power detector. In such an implementation, the power detector can detect when a port is connected, but not necessarily which port of multiple ports is connected. However, additional processes, such as toggling between data channels and listening for activity, can identify the active port. In some embodiments, using a combination of hardware and software can solve the detection problem with less hardware components than the more typical implementation with separate detection mechanisms. This can lead to cost savings that are beneficial in mass produced data storage devices, where small savings add up over large volumes.

Storage Devices with Multiple Ports

FIG. 1 is a diagram illustrating an embodiment of a storage device 100 with multiple ports, in which the storage device 100 is communicatively coupled to a host system. The storage device 100 may provide file-based or object-based data storage services to connected devices. In most embodiments, the storage device 100 does not have a display or an internal power source, and relies on the host device for power.

Typically, the storage device 100 is connected to one host device at a time. In some embodiments, rather than allowing for multiple concurrent connections, the multiple ports provide different connection types to support different data throughputs. For example, a USB 2.0 Type-A port supports up to 480 Megabits per second (Mbps) while a USB 3.1 Type-C port supports up to 10 Gigabits per second (Gbps). A USB Type-A port is a larger non-reversible port while a Type-C port is a smaller reversible port. These are just two possible form factors for USB; other form factors include Type-B, micro-USB (A, B, mini-b, etc.), and others. As new standards evolve, ports can be expected to support even higher throughputs and use other form factors and/or standards.

Some storage devices are designed to be put into a computer system. For example, solid-state-drives (SSDs) in the M.2 or 2.5" form factor and hard disk drives (HDDs) or solid state hybrid drives (SSHDs) in a 2.5" or 3.5" form factor are designed to be put into servers, computers, laptops or the like. However, some storage devices are configured to run externally from a host system. For example, DAS devices are configured to be removably connected (e.g., through USB) to host systems and be easily disconnected. Many such devices typically lack a display and an independent power source, such as a battery or a power supply. Instead, such devices communicate and obtain power through the host. For example, such devices can send messages for display on a user interface of the host that is shown on a host's display screen. Such devices may also connect through an interface capable of providing power, as well as transfer of data, such as USB.

In some embodiments, the storage device 100 is a DAS device that is external to a host system and is configured to be removably attached to a port or interface of the host system. In one embodiment, the DAS device does not have its own power source but relies on the host system to obtain power from the connected port. The storage device 100 can include an enclosure housing control circuitry 102 for controlling operations of the storage device 100, non-volatile memory 104 for persistently storing data, and a first data port 106 and a second data port 108. In some embodiments, the storage device 100 lacks a display, input device (e.g., keyboard, touchscreen, buttons, etc.), and/or power source. For example, the storage device 100 may be an external drive or thumb drive but is not a smart phone, tablet, or other similar standalone computing device.

The control circuitry 102 of the storage device 100 can include one or more central processing units (CPUs), controllers 116, memory, input/output interfaces, and/or the like. The control circuitry may include hardware configured to execute certain software applications, drivers, or firmware for implementing the functionality described herein. The control circuitry 102 can also include a power detector 110 for detecting power from either the first data port 106 or the second data port 108 and a transceiver 114 for providing a bridge between the digital and modulated parts of the interface. Furthermore, the control circuitry 102 may be configured to run firmware 112 for controlling operations of the storage device 100.

In one embodiment, the power detector 110 is a VBUS detector, as described in the USB specification. When the host connection is detected by the USB device, the USB device connects a pull-up resistor either to D+ or to D− data signal, allowing the host to detect the USB device's presence on the bus. In some embodiments, the VBUS detector is incorporated as part of a detector chip that detects when a host is connected as well as the orientation of the connected plug.

The storage device 100 can utilize various types of non-volatile memory 104 such as magnetic storage media (e.g. HDD), NAND memory (e.g. SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. New types of emerging non-volatile memory could also be used such as Program in Place or Storage Class Memory (SCM) such as resistive random-access memory (ReRam), phase-change memory (PCM), and magnetoresistive random-access memory (MRAM).

The types of host devices that may access the storage device 100 can include phones 137, such as smartphones, cable set-top boxes 136, smart TV's 135, video game consoles 134, laptop computers 133, tablet computers 132, desktop computers 131, wearable computers (not shown) and/or other network-connected computing devices. A representative host system 150 is shown in FIG. 1, the host system including a device driver 152 and a data and/or power interface 154 such as USB.

The host system 150 can include a device driver 152 (e.g., for supporting USB devices) and the data/power interface 154 for communicating with the storage device 100 and providing it with power. Typically, the data and power interface 154 is combined into a single physical port, such as some form of USB port (e.g., USB-A, USB-B, USB-C, mini-USB, micro-USB, etc.), Thunderbolt port, power over Ethernet (PoE), or the like. However, some devices may have separate ports for data (e.g., external Serial Advanced Technology Attachment (eSATA), Ethernet, etc.) and power. In the some embodiments, two or more corresponding data ports 106, 108 are found on the storage device 100.

Example USB Enumeration Process

In some embodiments, the storage device 100 is a USB external drive (e.g., USB flash drive or USB external hard drive) where the data ports 106, 108 are USB connectors for connecting to the host system 150. Contained in an enclosure may be an SSD drive, SSHD drive, HDD drive, flash memory chips, or the like for storing data. In some embodiments, the USB external drive lacks a power supply and a display. Instead, it obtains power through the USB connector when connected to the host system 150. USB bus powered devices get power from the USB host system. A VBUS signal is sent from the host system and this VBUS signal delivers power from the host system to the storage device. With the receipt of power, an USB enumeration process begins on the storage device 100 and the connected host.

The following describes embodiments of the USB enumeration process, primarily for USB 3.0 and USB 2.0. However, other USB processes may differ, particularly as new standards are developed. In addition, embodiments of the storage device 100 are not limited to the USB protocol, though the following describes an enumeration process specific to USB.

USB enumeration is the process of a host system 150 detecting that a USB device has been connected, identifying what has been connected, and then loading the relevant device drivers. The USB specification defines six device states. During enumeration, a device moves through four of the states: Powered, Default, Address, and Configured. This involves a mixture of hardware for detecting something is present and software to identify what has been connected. After detecting the presence of a connected USB device, the host system will initiate a transfer with the USB device to determine what type of device it is. The host system asks for device descriptors, which define the device class and what drivers need to be loaded.

A USB hub typically continually monitors the voltage levels on D+ and D− signal lines of each of its ports. In one embodiment, a USB port without a connected device uses a 15 kilo ohm pull-down resistors to make a connection between the USB D+ signal line, the D− signal line, and the GND (ground) line. When a device is inserted into a USB port, the device brings its line high with its own pull-up resistors, which allows the host to detect that a device is connected. SuperSpeed (SS) Tx (transmitter) and Rx (receiver) pairs are connected to corresponding host lines. The D+ and D− lines are connected as well, but initially do nothing. The host periodically sends, on its SS Tx line, short common-mode pulses of positive polarity, and waits for a line response. If the line is connected and therefore terminated with the two resistors (2×45 Ohm), the resulting resistor-capacitor (RC) of the connected line is different from an open line. The transmitter identifies this, and proceeds to polling with Low Frequency Periodic Signaling (LFPS). The process is called "Rx Detect." The attached device tries to do the same with its Tx, but only upon seeing a VBUS signal. If termination is detected, it starts its own LFPS polling. These two processes are independent and asynchronous.

Whichever side starts LFPS poling first, it waits for the link partner to start its own LFPS polling. When the first partner detects valid LFPS bursts, it ends its LFPS polling and moves to link training sequencing. The partner then follows. If one partner does not see the polling from other side in 360 milliseconds (ms), it moves into a compliance pattern (the device side does this automatically, the host may need to be enabled). This means it will take 360 ms to move to USB 2.0 in case the device is not USB 3.0. If the LFPS handshake was successful, both partners proceed into link training, sending training sequence (TSEQ), TS1, and then TS2 ordered sets, which are unique start-of-packet delimiters. The link then moves into active UO state, exchanging link management packets and determining link capabilities. Then the protocol layer kicks in and SS enumeration starts. If both link partners failed to detect Rx termination, the SS device downgrades to establishing a slower USB 2.0 connection. It begins the USB 2.0 enumeration process by pulling up D+ line with 1.5k resistor. Then the link proceeds with USB 2.0 protocol.

On detecting a downstream SuperSpeed termination at a port, a host initializes and trains the port's link. Enumeration then proceeds at SuperSpeed (USB 3.0+) with no need for further speed detecting. Detecting whether connected device supports high speed, the USB host uses two special signal states known as J and K chirp. The host sends a series of alternating chirp K and chirp J. On detecting the pattern KJKJKJ, the device removes (switches off) its full-speed pull-up resistors and performs all further communications at high speed (USB 2.0). If this initial communication fails then the USB host assumes that the device is a full speed device (USB 1.1).

Once the USB host determines that the device is connected and at what data transfer rate it should communicate, the host sends a reset to the USB device. The device starts communication with the host by using the default address of 00h. The device is in the Default state and device's USB registers are in their reset states. Now, the device is ready to respond to control transfers at endpoint zero. This reset is visible to the new device only and the other devices on the bus do not see the reset. For USB 3.0, the host is not required to reset the port after learning of a new device connection.

The host sends the request to device address 00h, endpoint zero. Because the host enumerates only one device at a time, only one device will respond to communications addressed to device address 00h even if several devices attach at once. There are different descriptors that can be sent. For example, two that are used for SuperSpeed are: the Binary Device Object Store (BOS) descriptor, which functions as a base descriptor for one or more related device capability descriptors, and the Device Capability Descriptor, which provides information that is specific to a technology or another aspect of a device or its function.

When the reset is complete, the host controller assigns a unique address to the device by sending a Set Address request. The address is valid until the device is detached a hub resets the port, or the system reboots. After learning about a device from its descriptor, the host looks for the best match in a driver to manage communications with the device.

While the above has described certain embodiments of the storage device 100, other embodiments are possible. For example, as new protocols and interfaces are developed, various ports can be included in the storage device 100. In addition, while the above has provided examples of DAS devices, such as USB sticks and USB drives, the devices and processes described herein could be used in other implementations. For example, PoE could be one supported interface. Furthermore, while the above has given examples of storage devices 100 with two ports, the described devices and processes can be applied to storage devices with more than two ports (e.g., 3 ports, 4 ports, 5 ports, etc.).

Storage Device with Separate Detection Lines

Figure 2:
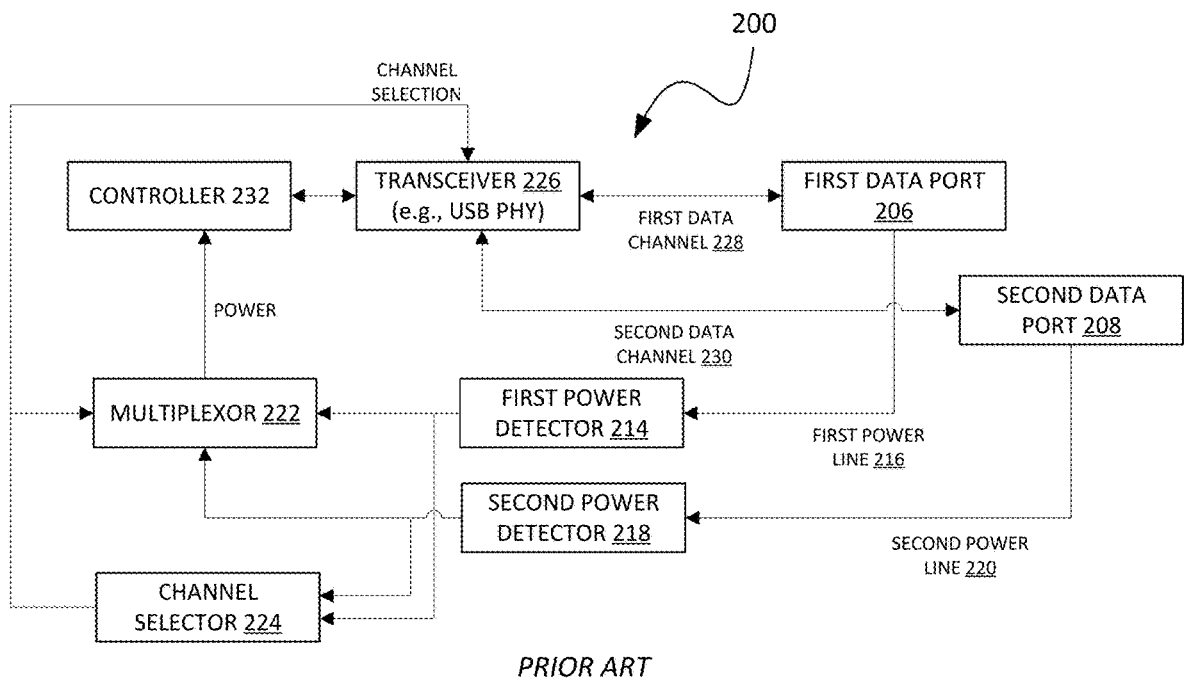
FIG. 2 illustrates a block diagram of a prior art storage device having a first data port and a second data port, each with a separate power detector.

FIG. 2 illustrates a block diagram of a prior art storage device 200 having a first data port 206 and a second data port 208, each with a separate power detector. The connected data port is identified by the corresponding power detector. The first data port 206 is connected to a first power detector 214 via a first power/detection line 216. The second data port 208 is connected to a second power detector 218 via a second power/detection line 220. The power/detection lines can be used to transmit power and to detect the presence of voltage indicating that a corresponding port is connected to a host system 150

Power from the first power detector 214 and the second power detector 218 flow to the multiplexor 222. Output from both the first power detector 214 and the second power detector 218 are routed to a channel selector. Based on which output is receiving power, the channel selector 224 is able to identify which port is connected. For example, if power is received by the channel selector 224 from the first power detector 214, then the channel selector can determine that the first data port 206 is connected to the host system. Likewise, the channel selector can determine if the second data port 208 is connected. The channel selector 224 can then provide the channel selection as input to a transceiver 226.

In one embodiment, the transceiver 226 comprises an integrated circuit that provides a bridge between the digital and modulated parts of the interface. For example, the transceiver 226 can be a USB physical layer (PHY) interface. While transmitting data, the PHY can serialize data and generates certain fields for the data. The PHY can also perform various operation such as bit stuffing and non-return-to-zero inverted (NRZI) encoding. Likewise, while receiving data, the PHY can de-serializes incoming data, stripping certain fields and performing bit un-stuffing and NRZI decoding.

The transceiver 226 can receive input through a first data channel 228 connected to the first data port 206 and a second data channel 230 connected to the second data port 208. As discussed above, embodiments of the first data port 206 and second data port 208 can transfer both power and data from the host system. Data is transferred through the data channels 228, 230 while power is transferred through the power/detection lines 216, 220. The transceiver 226 receives the channel selection from the channel selector 224 and determines which data channel to receive data from. For example, if the channel selector 224 detects power from the first power detector 214, it indicates to the transceiver 226 that the first data channel 228 should be the selected channel. Once data is received from the host system, the transceiver 226 can provide the data to the controller 232.

Meanwhile, the multiplexor 222 also receives the channel selection information and uses that data to select the active connection from the appropriate power detector 214, 218. For example, in the above example, the first power detector 214 is receiving power from the first data port 206 so the multiplexor 222 passes on the power from the first power detector 214 to the controller 232. The power can also be provided to other components of the control circuitry, such as the transceiver 226.

Storage Device with Shared Detection Line

Figure 3:
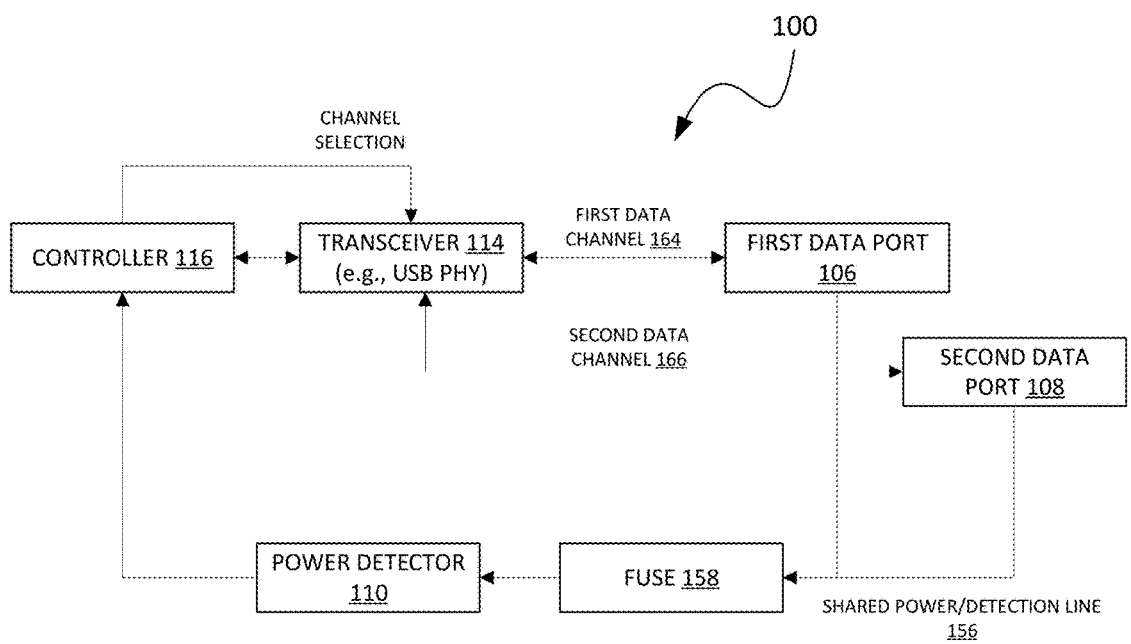
FIG. 3 illustrates a block diagram of a storage device having a first data port and a second data port with a power detector connected to the ports via a shared power/detection line, in accordance with some embodiments.

FIG. 3 illustrates a block diagram of the storage device 100 having a first data port 106 and a second data port 108 with a power detector 110 connected to the ports via a shared power/detection line 156. In contrast to the prior art storage device 200 of FIG. 2, several components have been eliminated, reducing costs. For example, the channel selector 224, the multiplexor 222, and/or the second power detector 218 can be removed. In some embodiments, the storage device 100 comprise one or more printed circuit board (PCBs), with various microchips, circuits, and other electrical components connected via traces formed in the layers of the PCB. For example, the shared power/detection line 156, the first data channel 164, and the second data channel 166 may be traces formed on the PCB.

The first data port 106 is connected to a power detector 110 via a shared power/detection line 156. The second data port 108 is connected to the power detector 110 via the shared power/detection line 156. Power from the first data port 106 or the second data port 108 flow to the power detector 110. In a typical use case, the storage device 100 can be connected to a host system 150 by either the first data port 106 or the second data port 108.

In some embodiments, the first data port 106 and the second data port 108 are different types of ports. The ports may differ in form factor and/or performance. In one example, the first data port is a USB 3.1 Type-C port while the second data port is a USB 2.0 Type-A port. The USB Type-C port uses a more compact form factor than the Type-A port, is reversible, and also has a higher data throughput.

In the typical use case, the storage device 100 is connected to the host system 150 through one of the ports. However, a user may sometimes connect both ports of the storage device 100 by mistake. For example, the user may connect the storage device 100 to a laptop via the second data port 108 while the storage device is already connected to a desktop computer via the first data port 106. With two connections to the storage device 100, the two connected host systems both provide power to the storage device 100. This can lead to a power overage on the shared power line. For example, if the first data port 106 provides power while the second data port also provides power, there may a power overage (e.g., voltage or current overage) in the power line. An optional fuse 158 can be included between the power detector 155 and the first data port 106 and second data port 108 to protect against a potential power overage. If power goes above a certain threshold, the fuse 158 can disconnect the power detector 110 (and other circuits downstream of the power detector) from the power source(s) (first data port 106 and/or second data port 108). By disconnecting from the power source, the fuse can protect downstream circuits from potential damage.

When power is received from either the first data port 106 or the second data port 108, the power detector 155 receives the power, which indicates that the storage device 100 is connected to the host system 150. The power detector 110 may initiate startup of the controller 116, as well as provide the power to the controller 116. The controller 116 can provide a channel selection to the transceiver 114, which can then select the corresponding data channel.

The transceiver 114 can be connected to the first data port 106 via a first data channel 164 and the second data port 108 via a second data channel. Based on the channel selection, the transceiver 162 can receive data from the first data port 106 or the second data port 108. For example, if the first data port 106 is connected, the transceiver 162 selects the first data channel 164.

In one embodiment, the transceiver 114 comprises an integrated circuit that provides a bridge between the digital and modulated parts of the interface. For example, the transceiver 162 can be a USB physical layer (PHY) interface. While transmitting data, the PHY can serialize data and generates certain fields for the data. The PHY can also perform various operation such as bit stuffing and non-return-to-zero (NRZI) encoding. Likewise, while receiving data, the PHY can de-serializes incoming data, stripping certain fields and performing bit un-stuffing and NRZI decoding.

In some embodiments, as the power detector 110 is connected to both the first data port 106 and the second data port 108, it can detect that one of the ports is connected but cannot distinguish between the ports. In those scenarios, the controller 160 can use information obtained from either the first data channel 164 or the second data channel 166 to identify which data channel is connected. For example, the controller 160 may toggle between the first data channel 164 and the second data channel 166 while waiting to receive a signal from the connected host system 150. If the controller 160 receives the signal from the first data channel 164, that indicates that the first data port 106 is connected. If the controller 160 receives the signal from second data channel 166, that indicates that the second data port 108 is connected. The process for identifying the connected data port are described in further detail in FIGS. 4-6.

After determining which data port is connected, the controller 160 sets the final channel selection to the transceiver 162, locking the data channel on which the transceiver is receiving. Data and/or commands can then be transferred between storage device 100 and the host system 150 via the selected data channel. In one embodiment, the channel selection is locked until the next enumeration or startup process runs. For example, if the storage device 100 is disconnected and reconnected again or otherwise loses power, the storage device 100 can run the process for identifying the connected data port again to find the currently connected data port.

Processes for Identifying Connected Port

FIG. 4 illustrates a process 400 for connecting the storage device 100 to the host system 150. At least some of the steps of the process 400 may be implemented at least in part by the storage device 100 or its components, such as the control circuitry 102 or its sub-components. For ease of explanation, the following refers to components described in FIGS. 1 and 3. However, the process 400 is not limited to those components and other embodiments of the storage device 100 may use different components to run the process.

At block 402, the process begins by connecting a storage device 100 to a host system 150 via at least one of first data port 106 with a first data transfer speed and a second data port 108 with a second data transfer speed, the second data transfer speed faster than the first data transfer speed. In one example, the first data port is a USB 2.0 Type-A port with a transfer rate of 480 Mbps while the second data port is a USB 3.0 Type-C port with a transfer rate of 5 Gbps. Other embodiments may use different port types and protocols, such as for example USB 3.1 with a 10 Gbps transfer speed or USB 4.0 with a 40 Gbps transfer speed. The first data port or the second data port can be physically connected to a corresponding host port via a cable. The cable may be a USB cable, with the same type of connectors (e.g., Type-C to Type-C) on the ends or different connectors on the ends (e.g., Type-A to Type-C).

At block 404, the storage device 100 detects voltage on a shared power/detection line 156 connected to the first data port and the second data port. In one embodiment, a first line from the first data port 106 and a second line from the second data port 108 are shorted together or otherwise electrically connected to form the shared power line. Other embodiments may detect current or power on the shared line.

At block 406, an optional fuse 158 of the storage device 100 is configured to, in response to a voltage overage on the shared power/detection line 156, disconnect the shared line from the control circuitry 102 of the storage device. By disconnecting the shared power line, the fuse can prevent electrical damage to the control circuitry 102 and/or to the non-volatile memory 104.

At block 408, the storage device 100 establishes a data connection with the host system 150 at the first data transfer speed or the second data transfer speed based on the connected port. In one embodiment, the controller 116 performs a process or protocol for establishing the connection (e.g., USB enumeration process). Further, the data transfer speed for communications between the host system and the storage device can be set. For example, if the connected port is the first data port 106, the first data transfer speed can be used. If the connected port is the second data port 108, the second data transfer speed can be used.

As the detection line is connected to both the first data port 106 and the second data port 108, it may be difficult to determine which port is connected solely relying on the hardware. FIGS. 5 and 6 describe possible processes for identifying which of the two ports are connected.

FIG. 5 illustrates a process 500 for identifying which port of a storage device 100 is connected to a host system 150. At least some of the steps of the process 500 may be implemented at least in part by the storage device 100 or its components, such as the control circuitry 102 or its sub-components. For ease of explanation, the following refers to components described in FIGS. 1 and 3. However, the process 500 is not limited to those components and other embodiments of the storage device 100 may use different components to run the process.

At block 502, the storage device 100 selects a first data channel 164 at the first data transfer speed. This first data channel is the default selection on which to listen for signals from the host system 150. In some embodiments, the process starts with the first data channel as the default because the corresponding data port is more widely deployed than a second data port. However, different embodiments can select the starting data channel for different reasons. For example, in one scenario, the first data channel is connected to a first data port with a slower data transfer speed than a second data port. In another scenario, the first data port has a faster data transfer speed than the second data port.

At block 504, the storage device 100 determines if a first signal is received from the host system 150 by listening for a signal on the first data channel 164. If no signal is received by a threshold time (e.g., a timer expires), then the process 500 proceeds to block 506. If a signal is received, then the process 500 proceeds to block 508.

In some embodiments, the threshold time may be in the hundreds of milliseconds, such as 200, 250, 300, 350, etc. Other embodiments may be longer or shorter. Typically, the host system 150 sends or resends a signal in a few (e.g., 1-20) milliseconds. Waiting for a few hundred milliseconds should be sufficient to receive a signal from the host system 150 if the host system is connected to the first data port 106.

At block 506 where no signal is received, the storage device 100 operates under the assumption that the host system 150 is sending a signal on the other port, rather than the currently selected port. In one embodiment, the storage device 100 locks the second data channel 166 at the second transfer speed and proceeds establishing communications with the host system 150 via the second data port 108 connected to the second data channel.

Alternatively, at block 508 where a signal is received on the first data channel 164, the storage device 100 locks the first data channel at the first data transfer speed. As the signal from the host system 150 has been received, the storage device 100 is able to determine that the host system 150 is connected via the first data port connected to the first data channel. The storage device 100 can proceed with establishing communications with the host system 150 via the first data port 106.

FIG. 6 illustrates a process 600 for identifying which port of the storage device 100 is connected to the host system 150. FIG. 6 describes an alternative process compared to FIG. 5. At least some of the steps of the process 600 may be implemented at least in part by the storage device 100 or its components, such as the control circuitry 102 or its sub-components. For ease of explanation, the following refers to components described in FIGS. 1 and 3. However, the process 600 is not limited to those components and other embodiments of the storage device 100 may use different components to run the process.

At block 602, the storage device 100 selects a first data channel 164 at the first data transfer speed. In one embodiment, the first data channel is the default selection on which to listen for signals from the host system 150. The first data channel may be selected as the default because the corresponding data port type is more widely deployed than a second data port type. The default channel may also be selected based on which port has a faster data transfer rate. However, different embodiments can select different default data channels. For example, in one scenario, the default first data channel 164 is connected to a first data port 106 with a slower data transfer speed than a second data port. In another scenario, the default first data channel 164 is connected to a first data port 106 with a faster data transfer speed than a second data port 108.

At block 604, the storage device 100 determines if a first signal is received from the host system 150 by listening for a signal on the first data channel. If no signal is received by a threshold time (e.g., a timer expires), then the process 600 proceeds to block 606. If a signal is received, then the process 600 proceeds to block 608.

In some embodiments, the threshold time may be in the a few milliseconds, such as 1, 2, 3, etc. Other embodiments may be longer or shorter. By switching between the first data channel and the second data channel, the storage device 100 can sample each data channel, waiting for a signal from the host system 150. As the host system 150 repeats the initial signal if no response is received from the storage device 100, the storage device 100 can likely catch one of the repeated signals even if it misses the initial instance of the signal.

In one embodiment, the threshold time to wait before switching to another data channel may incorporate a random time element. For example, the threshold time may be a randomly selected number from 1-10 milliseconds. By incorporating a random time element, the storage device 100 can avoid a synchronicity issue where switching between data channels may coincide with the timing of the repeated signals from the host, thereby avoiding a situation where the storage device 100 repeatedly switches out to the other data channel right before the signal is sent on the current data channel by the host system 150.

At block 608 where a first signal is received on the first data channel 164, the storage device 100 locks the first data channel at the first data transfer speed. As the signal from the host system 150 has been received, the storage device 100 is able to determine that the host system 150 is connected via the first data port 106 connected to the first data channel. The storage device 100 can proceed with establishing communications with the host system 150 via the first data port.

Alternatively, at block 606, where the first signal is not received, the storage device 100 switches data channels and selects a second data channel 1666 operating at a second data transfer speed. The storage device 100 listens at the second data channel for a second threshold time. The first and second threshold times may be the same amount of time or may differ from each other.

At block 610, the storage device 100 determines if a first signal is received from the host system 150 by listening for the first signal on the second data channel 166. If no signal is received by the second threshold time, then the process 600 proceeds back to block 602, where the storage device 100 toggles back to the first data channel to wait for the first signal. If the first signal is received, then the process 600 proceeds to block 612.

At block 612 where the first signal is received on the second data channel 166, the storage device 100 locks the second data channel at the second data transfer speed. As the signal from the host system 150 has been received, the storage device 100 is able to determine that the host system 150 is connected via the second data port connected to the second data channel. The storage device 100 can proceed with establishing communications with the host system 150 via the second data port.

ADDITIONAL EMBODIMENTS

Those skilled in the art will appreciate that in some embodiments, other types of storage devices 100 with shared detection lines can be implemented while remaining within the scope of the present disclosure. In addition, the actual steps taken in the processes discussed herein may differ from those described or shown in the figures. Depending on the embodiment, certain of the steps described above may be removed, may be combined with other steps, or may have other steps added.

While certain embodiments have been described, these embodiments have been presented by way of example only, and are not intended to limit the scope of protection. Indeed, the novel methods and systems described herein may be embodied in a variety of other forms. Furthermore, various omissions, substitutions, and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A storage device comprising:
    non-volatile memory configured to store data;
    a first data port configured to have a first data transfer speed;
    a second data port configured to have a second data transfer speed faster than the first data transfer speed;
    a shared detection line connected to the first data port and the second data port;
    control circuitry connected to the shared detection line, the control circuitry configured to:
        detect voltage on the shared detection line in response to a connection of at least one of the first data port and the second data port to a host system;
        determine which of the first data port or the second data port is connected to the host system; and
        establish a data connection with the host system at the first data transfer speed or the second data transfer speed based on the determined port connected to the host system; and
    a fuse between the shared detection line and the control circuitry, the fuse configured to disconnect the shared detection line from the control circuitry in response to a voltage overage being received from connecting both the first data port and the second data port to power sources.

2. The storage device of claim 1, wherein the host system comprises the power sources.

3. The storage device of claim 1, further comprising:
    a first data channel connected to the first data port; and
    a second data channel connected to the second data port;
    wherein the control circuitry is further configured to determine which of the first data port or the second data port is connected to the host system by:
        toggling between the first data channel and the second data channel; and
        awaiting a command from the host system.

4. The storage device of claim 3, wherein the control circuitry is further configured to determine which of the first data port or the second data port is connected to the host system by:
    in response to receiving the command on the first data channel, establishing a first data connection to the host system at the first data transfer speed through the first data port; and
    in response to receiving the command on the second data channel, establishing a second data connection to the host system at the second data transfer speed through the second data port.

5. The storage device of claim 3, wherein the control circuitry is further configured to determine which of the first data port or the second data port is connected to the host system by:
- awaiting the command from the host system on the first data channel;
- in response to receiving the command, establishing a first data connection to the host system at the first data transfer speed through the first data port; and
- in response to not receiving the command prior to a timer expiring, establishing a second data connection to the host system at the second data transfer speed through the second data port.

6. The storage device of claim 3, wherein the control circuitry is further configured to determine which of the first data port or the second data port is connected to the host system by:
- awaiting the command from the host system on the first data channel;
- in response to receiving the command, establishing a first data connection to the host system at the first data transfer speed through the first data port; and
- in response to not receiving the command prior to a first timer expiring:
  - awaiting the command from the host system on the second data channel;
  - in response to receiving the command, establishing a second data connection to the host system at the second data transfer speed through the second data port; and
  - in response to not receiving the command prior to a second timer expiring, awaiting the command from the host system on the first data channel.

7. The storage device of claim 1, wherein:
- the first data port is a first type of universal serial bus (USB) port; and
- the second data port is a second type of USB port.

8. The storage device of claim 1, wherein:
- the first data port is a universal serial bus (USB) Type-A port; and
- the second data port is a USB Type-C port.

9. The storage device of claim 1, wherein the shared detection line is configured to provide power to the control circuitry and the non-volatile memory from the host system.

10. A method for detecting which port of multiple ports of a storage device is connected to a host system using a shared detection line, the shared detection line connected to a first data port and a second data port of the storage device, the method comprising:
- receiving a connection to a host system on the first data port or the second data port, the first data port having a first data transfer speed and the second data port having a second data transfer speed faster than the first data transfer speed;
- detecting voltage on the shared detection line in response to the received connection to the host system;
- determining which of the first data port or the second data port is connected to the host system;
- establishing a data connection with the host system at the first data transfer speed or the second data transfer speed based on the determined port connected to the host system; and
- disconnecting, by a fuse, the shared detection line from control circuitry of the storage device in response to a voltage overage being received from connecting both the first data port and the second data port to power sources.

11. The method of claim 10, wherein determining which of the first data port or the second data port is connected to the host system comprises:
- toggling between a first data channel connected to the first data port and a second data channel connected to the second data port; and
- awaiting a command from the host system.

12. The method of claim 11, wherein determining which of the first data port or the second data port is connected to the host system further comprises:
- in response to receiving the command on the first data channel, establishing a first data connection to the host system at the first data transfer speed through the first data port; and
- in response to receiving the command on the second data channel, establishing a second data connection to the host system at the second data transfer speed through the second data port.

13. The method of claim 11, wherein determining which of the first data port or the second data port is connected to the host system further comprises:
- awaiting the command from the host system on the first data channel;
- in response to receiving the command, establishing a first data connection to the host system at the first data transfer speed through the first data port; and
- in response to not receiving the command prior to a timer expiring, establishing a second data connection to the host system at the second data transfer speed through the second data port.

14. The method of claim 11, wherein determining which of the first data port or the second data port is connected to the host system further comprises:
- awaiting the command from the host system on the first data channel;
- in response to receiving the command, establishing a first data connection to the host system at the first data transfer speed through the first data port; and
- in response to not receiving the command prior to a first timer expiring:
  - awaiting the command from the host system on the second data channel;
  - in response to receiving the command, establishing a second data connection to the host system at the second data transfer speed through the second data port; and
  - in response to not receiving the command prior to a second timer expiring, awaiting the command from the host system on the first data channel.

15. The method of claim 10, wherein:
- the first data port is a first type of universal serial bus (USB) port; and
- the second data port is a second type of USB port.

16. The method of claim 10, wherein:
- the first data port is a universal serial bus (USB) Type-A port; and
- the second data port is a USB Type-C port.

17. A storage device comprising:
- means for persistently storing data;
- a first data port having a first data transfer speed;
- a second data port having a second data transfer speed faster than the first data transfer speed;
- a shared detection line connected to the first data port and the second data port;
- means for detecting voltage on the shared detection line in response to a connection of at least one of the first data port and the second data port to a host system;

means for determining which of the first data port or the second data port is connected to the host system;

means for establishing a data connection with the host system at the first data transfer speed or the second data transfer speed based on based on the determined port connected to the host system; and a fuse between the shared detection line and control circuitry of the storage device, the fuse configured to disconnect the shared detection line from the control circuitry in response to a voltage overage being received from connecting both the first data port and the second data port to power sources.

18. The storage device of claim 17, wherein the host system comprises the power sources.

19. The storage device of claim 17, wherein:

the first data port is a first type of universal serial bus (USB) port; and the second data port is a second type of USB port.

20. The storage device of claim 17, wherein:

the first data port is a universal serial bus (USB) Type-A port; and the second data port is a USB Type-C port.

* * * * *